US011063518B1

(12) United States Patent
Cook et al.

(10) Patent No.: US 11,063,518 B1
(45) Date of Patent: Jul. 13, 2021

(54) BI-DIRECTIONAL ISOLATED DC-DC CONVERTER FOR THE ELECTRIFICATION OF TRANSPORTATION

(71) Applicant: VANNER, INC., Hilliard, OH (US)

(72) Inventors: Alexander Cook, Dublin, OH (US); Alexander Isurin, Dublin, OH (US)

(73) Assignee: VANNER, INC., Hilliard, OH (US)

( * ) Notice: Subject to any disclaimer, the term of this patent is extended or adjusted under 35 U.S.C. 154(b) by 0 days.

(21) Appl. No.: 16/594,320

(22) Filed: Oct. 7, 2019

Related U.S. Application Data

(63) Continuation of application No. 16/171,038, filed on Oct. 25, 2018, now Pat. No. 10,483,862.

(51) Int. Cl.
*H02M 3/335* (2006.01)
*H02M 1/00* (2006.01)

(52) U.S. Cl.
CPC ... *H02M 3/33561* (2013.01); *H02M 3/33584* (2013.01); *H02M 2001/008* (2013.01); *H02M 2001/0058* (2013.01)

(58) Field of Classification Search
CPC ......... H02M 3/33584; H02M 3/33561; H02M 7/797; H02M 2001/008; H02M 2001/0058; H02M 2001/009; H02J 1/084
See application file for complete search history.

(56) References Cited

U.S. PATENT DOCUMENTS

| | | | |
|---|---|---|---|
| 4,257,087 A | 3/1981 | Cuk | |
| 7,778,046 B1 | 8/2010 | Cuk et al. | |
| 9,118,241 B2 | 8/2015 | Broussev et al. | |
| 9,240,723 B2 | 1/2016 | Boysen et al. | |
| 9,564,775 B2 | 2/2017 | Liu et al. | |
| 9,871,450 B2 | 1/2018 | Isurin et al. | |
| 10,483,862 B1 | 11/2019 | Cook et al. | |
| 2001/0009516 A1 | 7/2001 | Kato | |
| 2002/0000923 A1 | 1/2002 | Nishikawa | |
| 2005/0152159 A1 | 7/2005 | Isurin et al. | |
| 2006/0139823 A1 | 6/2006 | Shoji et al. | |
| 2007/0159114 A1 | 7/2007 | Chang et al. | |
| 2008/0309406 A1 | 12/2008 | Jonkman | |
| 2010/0226154 A1 | 9/2010 | Leu | |
| 2011/0038181 A1 | 2/2011 | Yan et al. | |

(Continued)

FOREIGN PATENT DOCUMENTS

| | | |
|---|---|---|
| EP | 0759654 A1 | 2/1997 |
| EP | 3290254 A1 | 3/2018 |
| GB | 2371928 A | 8/2002 |

OTHER PUBLICATIONS

F. Forest et al., "Design of a 28V-to-300V12KW Multi-cell Interleaved Flyback Converter Using Intercell Transformer", IEEE Transactions on Power Electronics, 25(8), 1966-1974pp, Sep. 2010.

(Continued)

*Primary Examiner* — Harry R Behm
(74) *Attorney, Agent, or Firm* — Ronald J. Koch; The Eley Law Firm

(57) ABSTRACT

A topology for an isolated, bi-directional, DC-DC converter, that provides step-up and step-down functionality, with a reduced transformer turns ratio, allows a simplified transformer design with reduced cost and increased efficiency. This topology also has a very small level of re-circulating current, relative to other topologies regarding cost and performance.

4 Claims, 14 Drawing Sheets

Three port DC-DC Converter

(56) References Cited

U.S. PATENT DOCUMENTS

| | | | |
|---|---|---|---|
| 2012/0163035 A1 | 6/2012 | Song et al. | |
| 2012/0287678 A1 | 11/2012 | Xu et al. | |
| 2013/0051102 A1 | 2/2013 | Huang et al. | |
| 2013/0070504 A1 | 3/2013 | Xu et al. | |
| 2015/0103561 A1 | 4/2015 | Dai et al. | |
| 2015/0109829 A1 | 4/2015 | Usami | |
| 2015/0263634 A1 | 9/2015 | Fu | |
| 2016/0072390 A1 | 3/2016 | Akutagawa et al. | |
| 2017/0025962 A1 | 1/2017 | Davidson et al. | |
| 2018/0183344 A1* | 6/2018 | Iwaya | H02M 3/33592 |
| 2019/0131874 A1* | 5/2019 | Saga | H02M 3/33507 |
| 2019/0267827 A1* | 8/2019 | He | H02J 7/342 |
| 2020/0195018 A1* | 6/2020 | Liu | H02M 7/797 |

OTHER PUBLICATIONS

S. Bali et al., "Modular Snubberless Bidirectional Soft-Switching Current-Fed Dual 6-pack DC/DC Converter", IEEE ECCE, Sep. 2014, 2043-2050pp.

Z. Wang et al., "A Soft Switching Three-Phase Current-Fed Bidirectional DC-DC Converter With High Efficiency Over a Wide Input Voltage Range", IEEE Transactions on Power Electronics, 27(2), 669-684pp, Feb. 2012.

A. Isurin et al., "A Novel Resonant Converter Topology and its Application", IEEE 32nd Annual PESC, Jun. 2001, pp. 1039-1044, vol. 2.

J.M. Kwon et al., "High Step-up Active-Clamp Converter With Input-Current Doubler and Output-Voltage Doubler for Fuel Cell Power Systems", IEEE Transactions on Power Electronics, 24(1), 108-115pp, Jan. 2009.

F. Z. Peng et al., "A New ZVS Bidirectional DC-DC Converter for Fuel Cell and Battery Application", IEEE Transactions on Power Electronics, 19(1), 54-65pp, Jan. 2004.

Y. Shi et al., "A Single-Phase Grid-Connected PV Converter with Minimal DC-Link Capacitor and Low-Frequency Ripple-Free maximum Point Tracking", IEEE ECCE, Sep. 2013, 2385-2390pp.

European Search Report, Application EP17167713, dated Sep. 8, 2017.

A. Isurin et al., "Step-up DC-DC converter for automotive application", 2016 18th EPE'16 ECCE Europe, Karlsruhe, Germany, Sep. 2016, pp. 1-9.

A. Isurin et al., "9kW Isolated DC-DC Converter for Hybrid Bus", Proc. Int. Exhibition & Conf. PCIM Europe 20152, Nuremberg, Germany, Jan. 2012, pp. 1-6.

Krismer et al., "Accurate Power Loss Model Derivation of a High-Current Dual Active Bridge Converter for an Automotive Application" in IEEE Trans. on Ind. Electron., vol. 57, No. 3, pp. 881-891, Mar. 2010.

Zhao et al., "An Isolated Three-Port Bidirectional DC-DC Converter With Decoupled Power Flow Management" IEEE Trans. on Power Electron., vol. 23, No. 5, pp. 2443-2453, Sep. 2008.

* cited by examiner

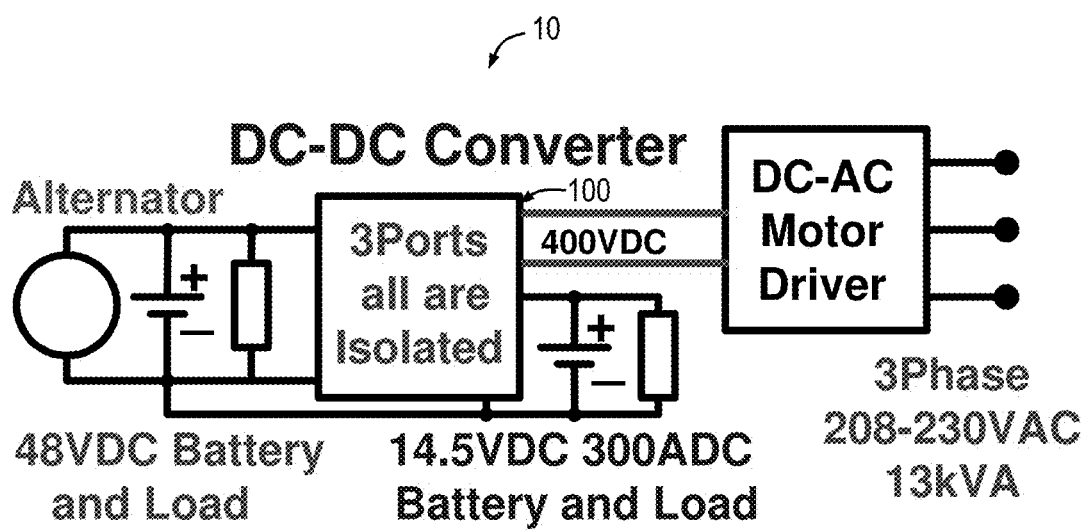
Fig. 1 Block Diagram

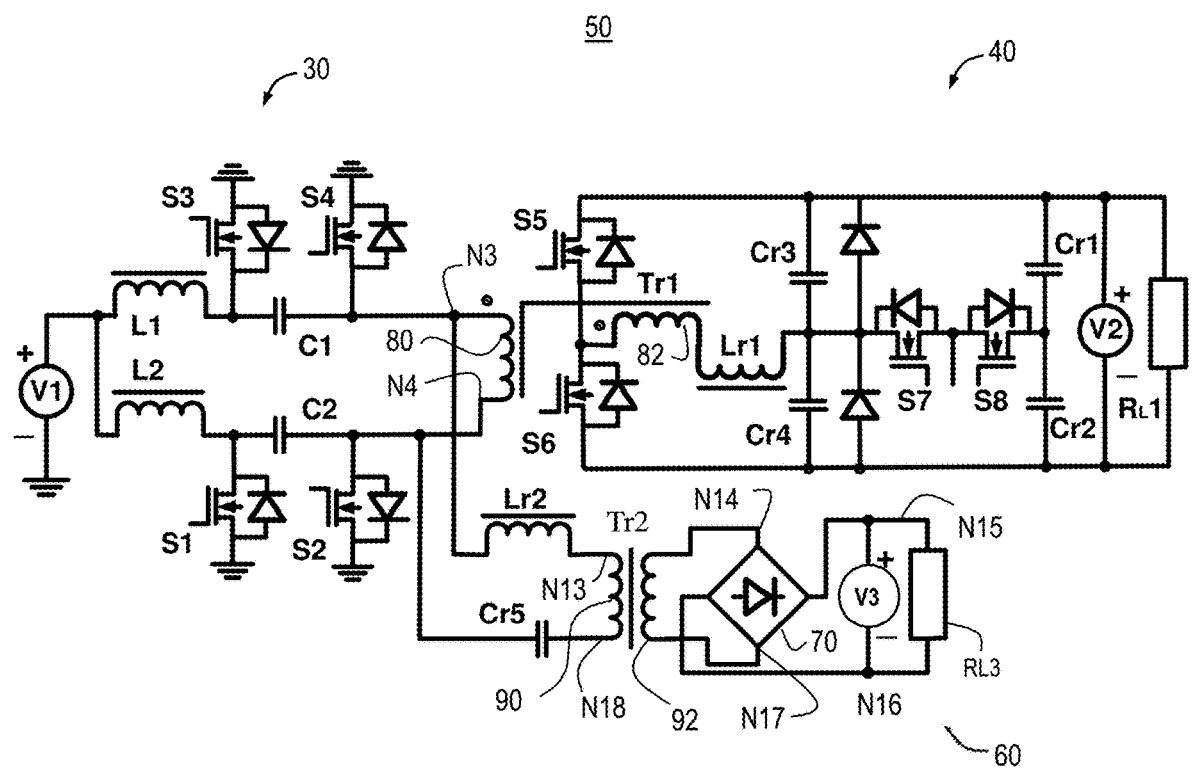
Fig. 2 Three port DC-DC Converter

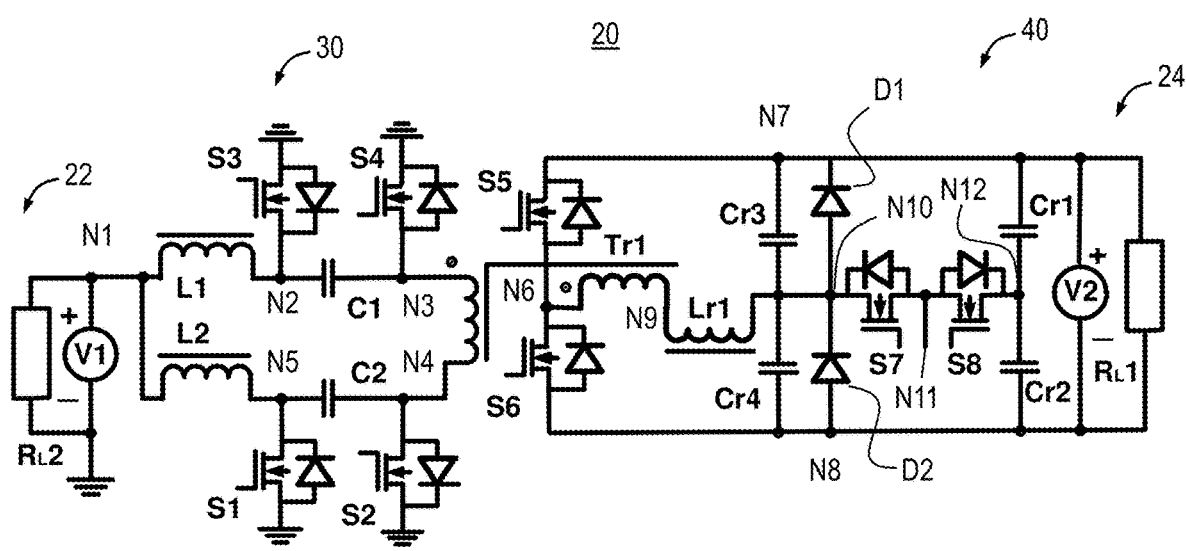
Fig. 3A - Two Port DC-DC Bi-directional Converter
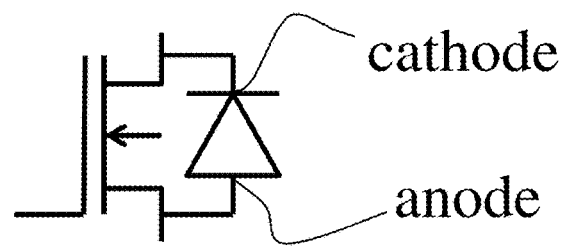
Fig. 3B

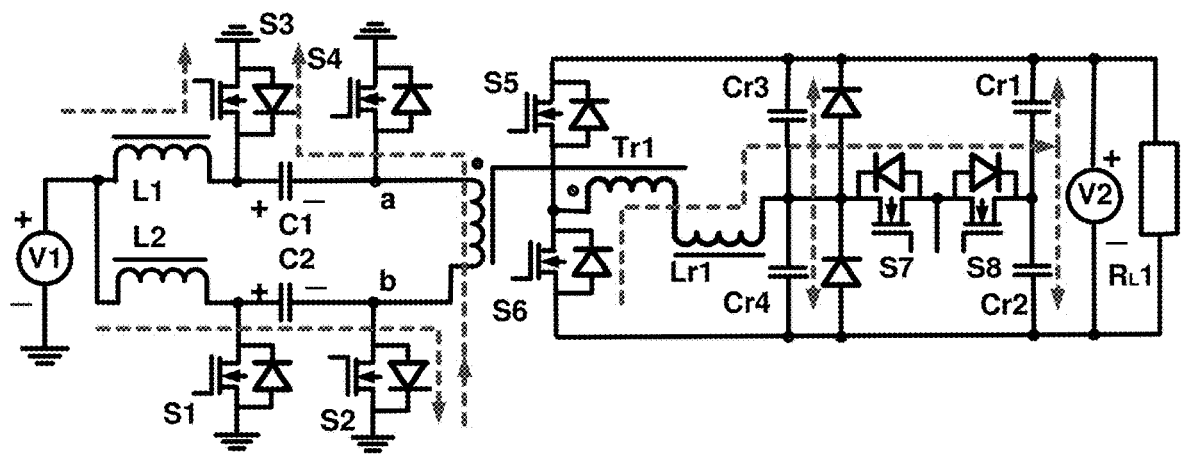
Fig. 4a time t0-t1
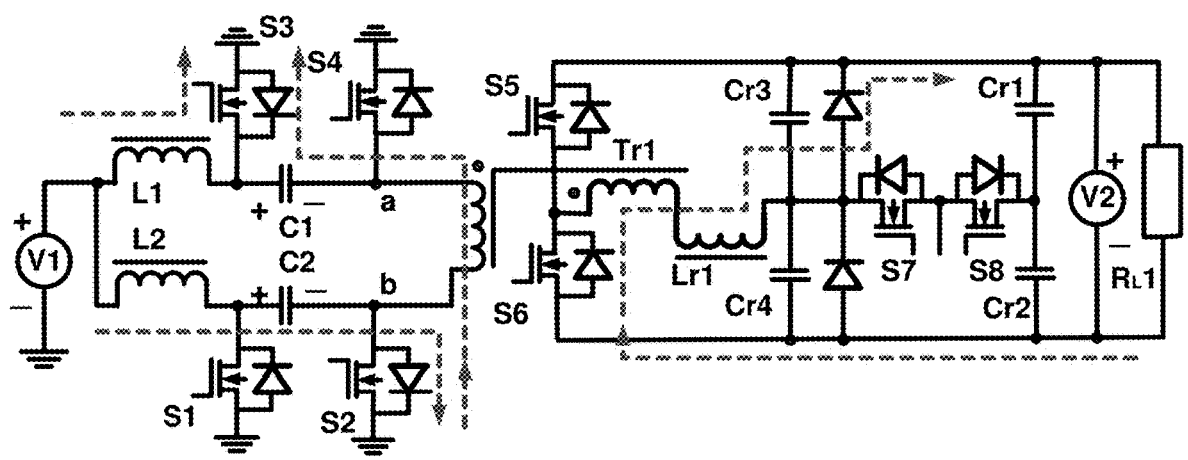
Fig. 4b time t1-t2

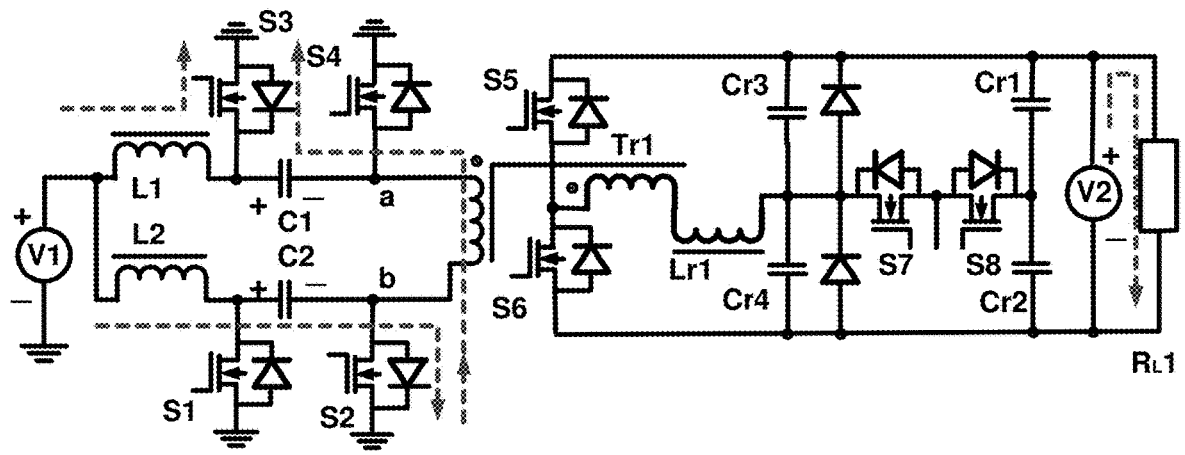
Fig. 4c time t2-t3
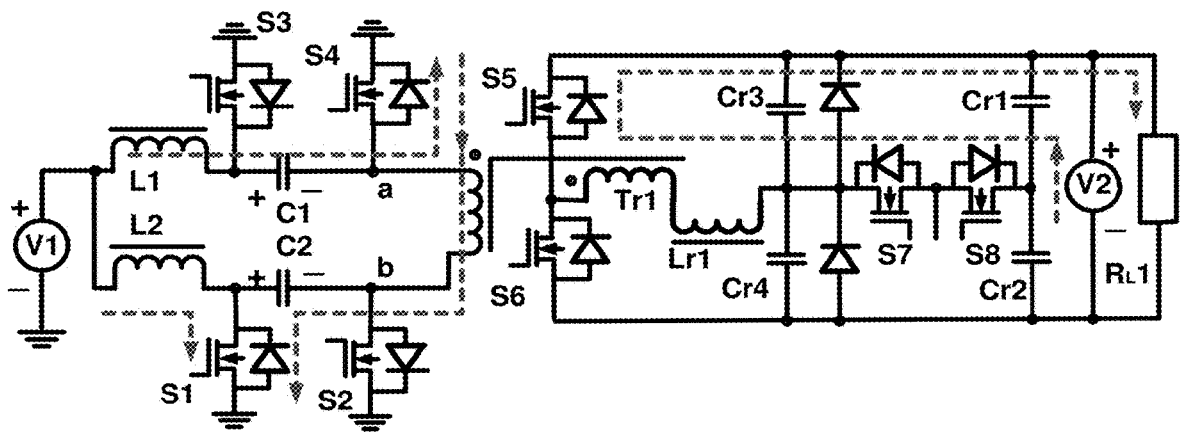
Fig. 4d time t3-t4

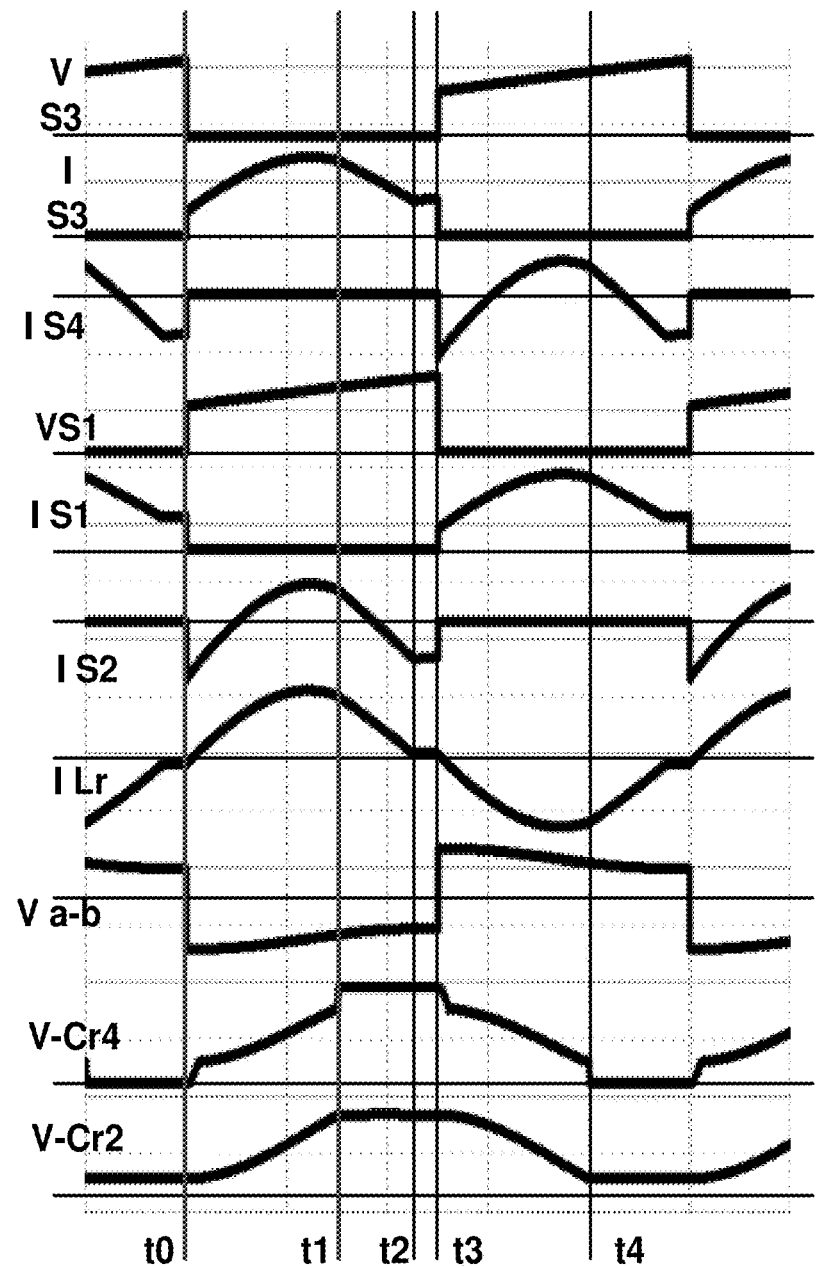
Fig. 5a time t0-t1

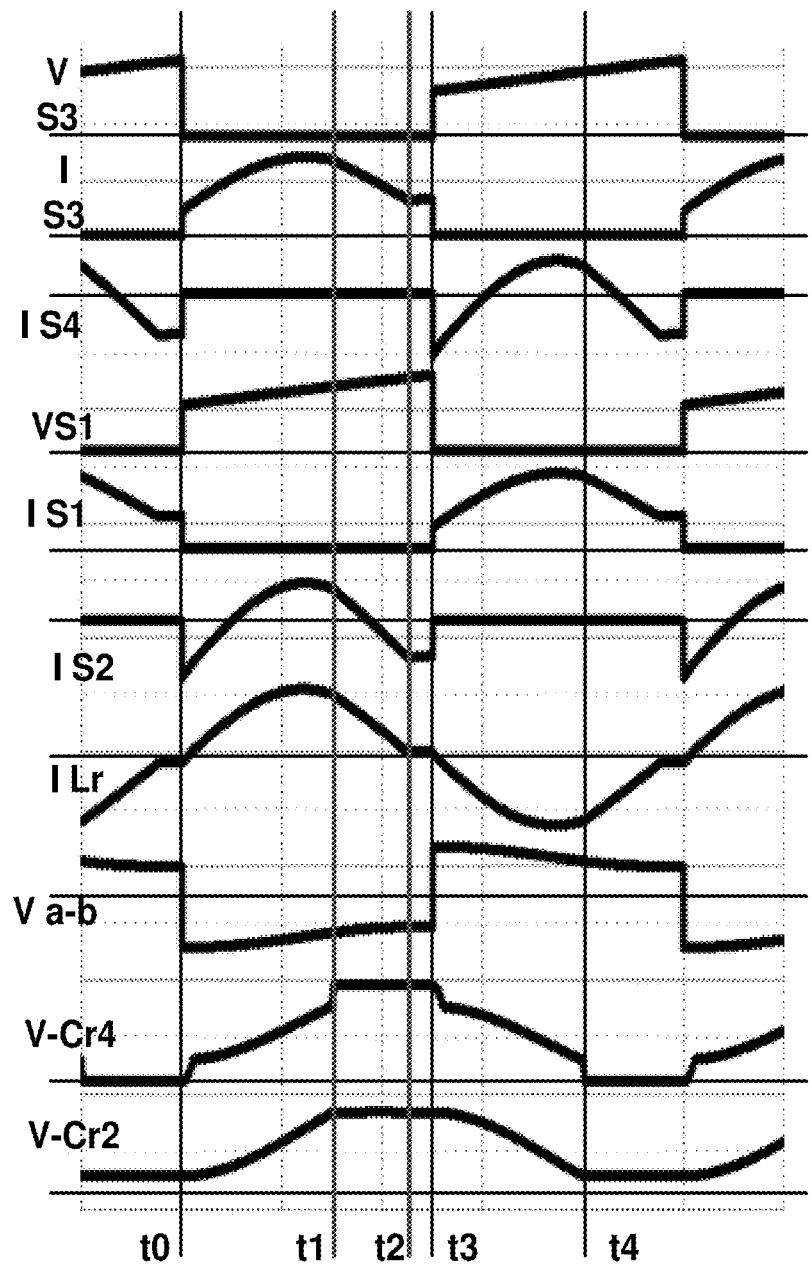
Fig. 5b time t1-t2

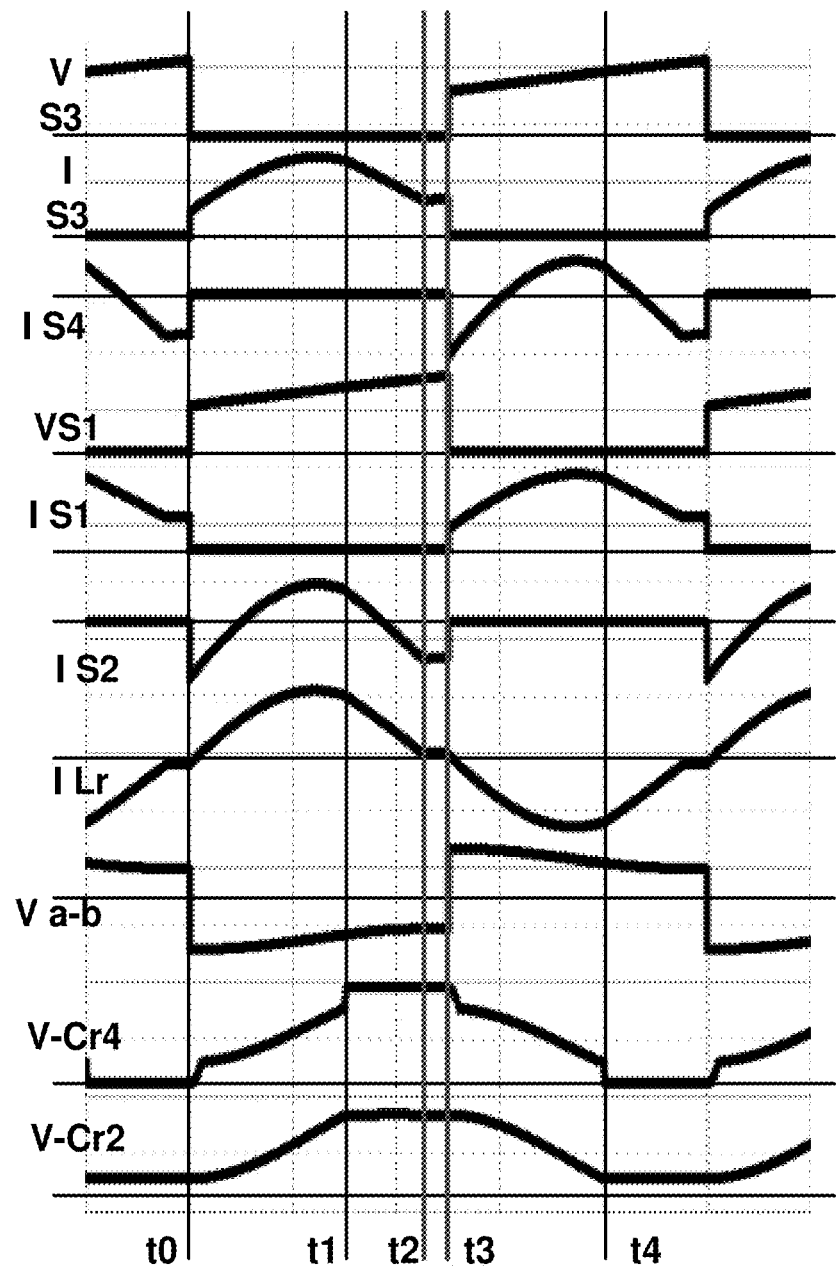
Fig. 5c time t2-t3

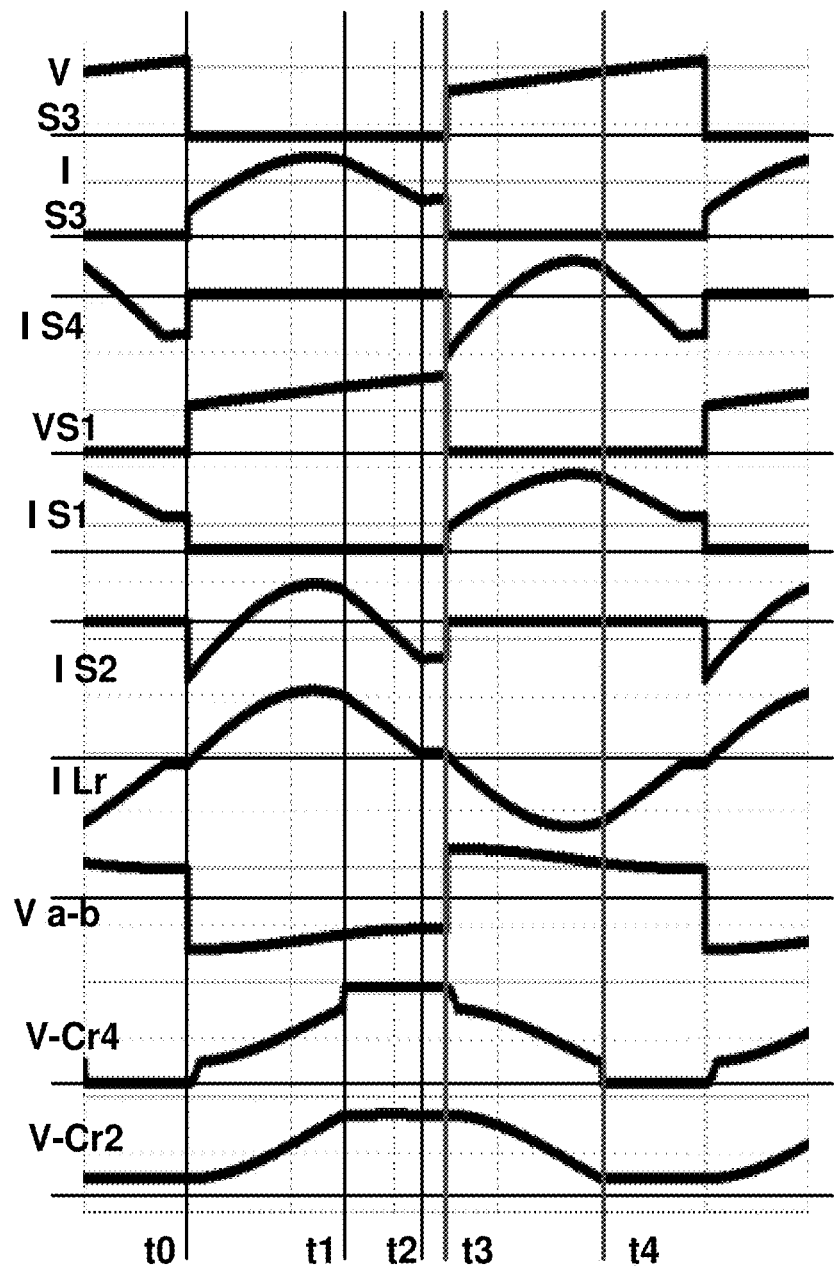
Fig. 5d time t3-t4

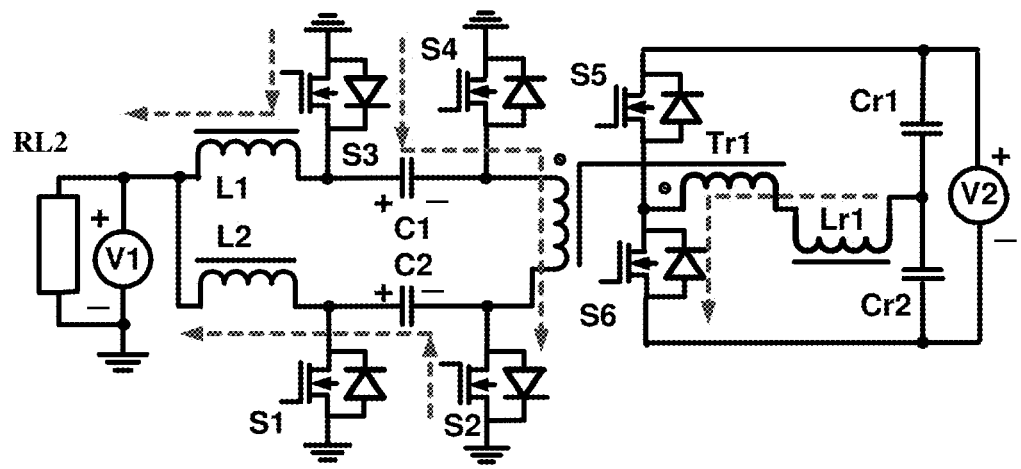
Fig. 6a time t0-t1
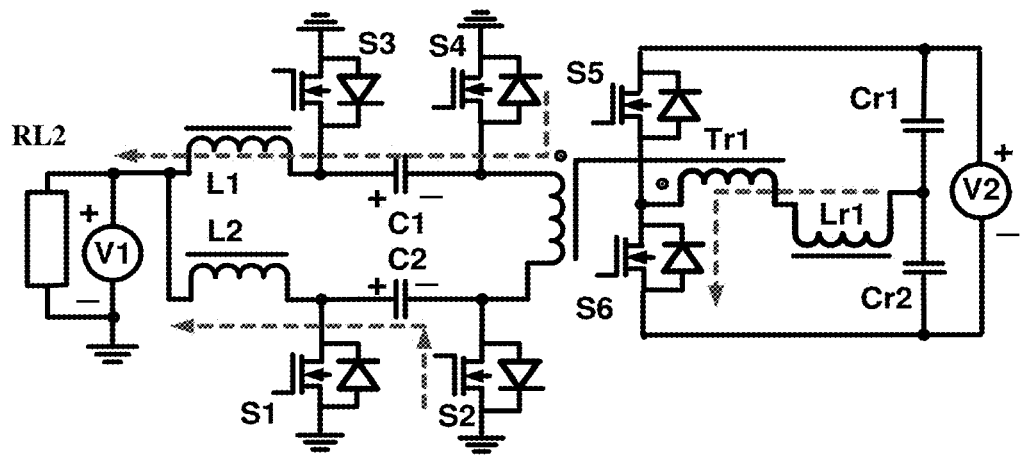
Fig. 6b time t1-t2

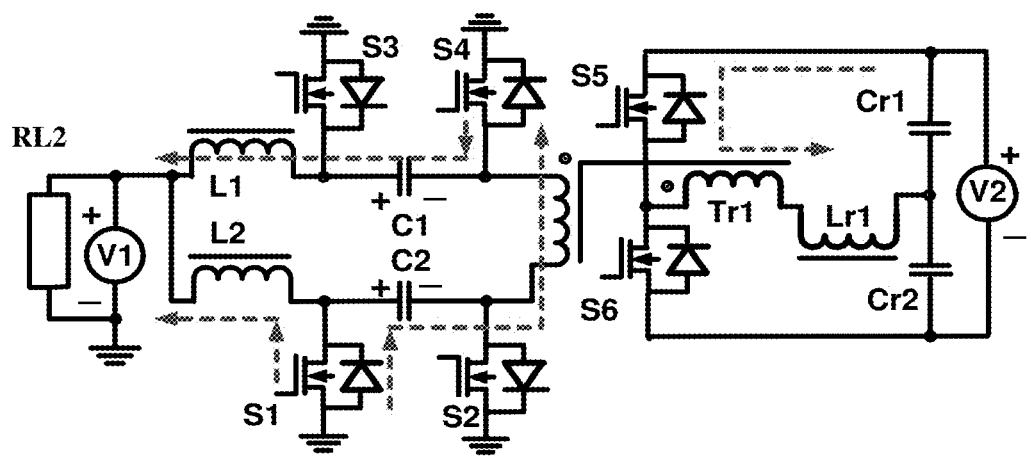
Fig. 6c time t2-t3

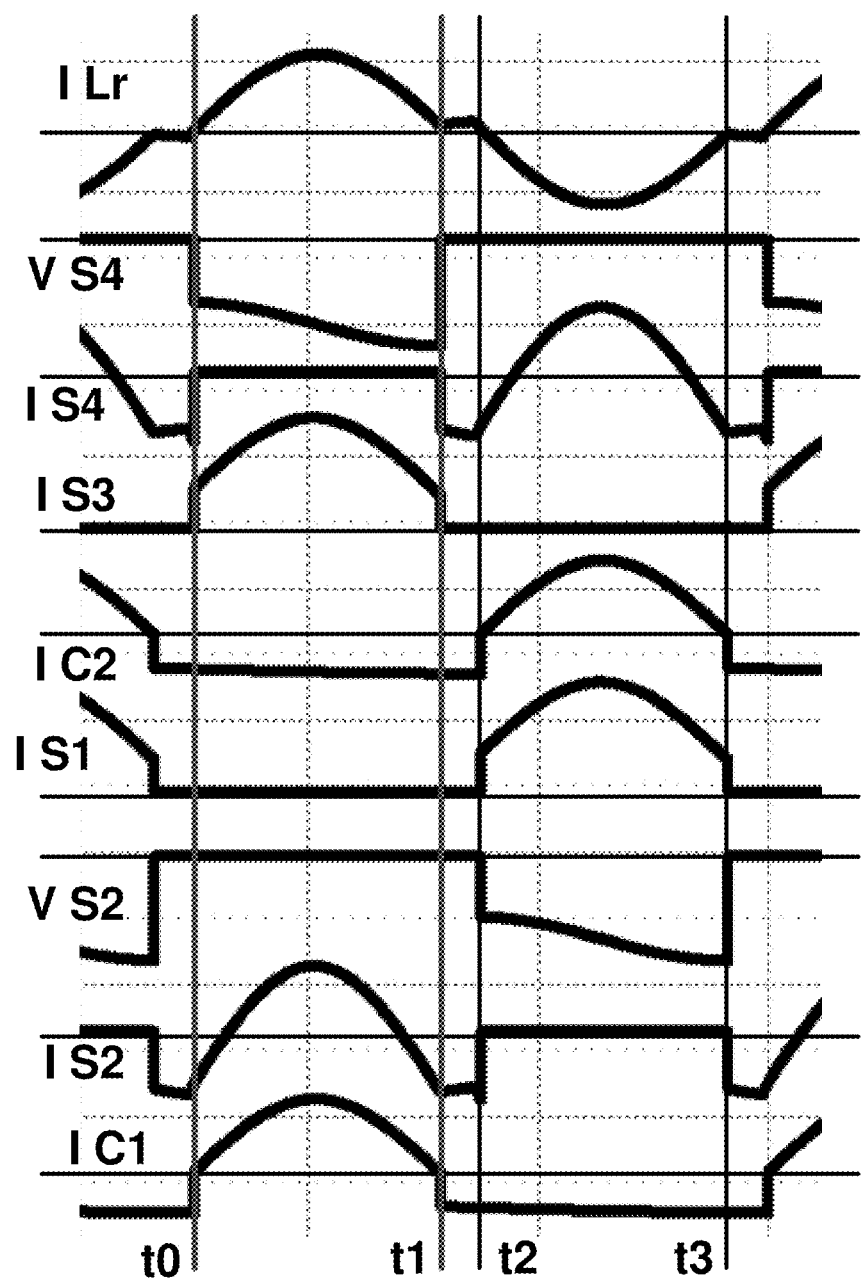
Fig. 7a time t0-t1

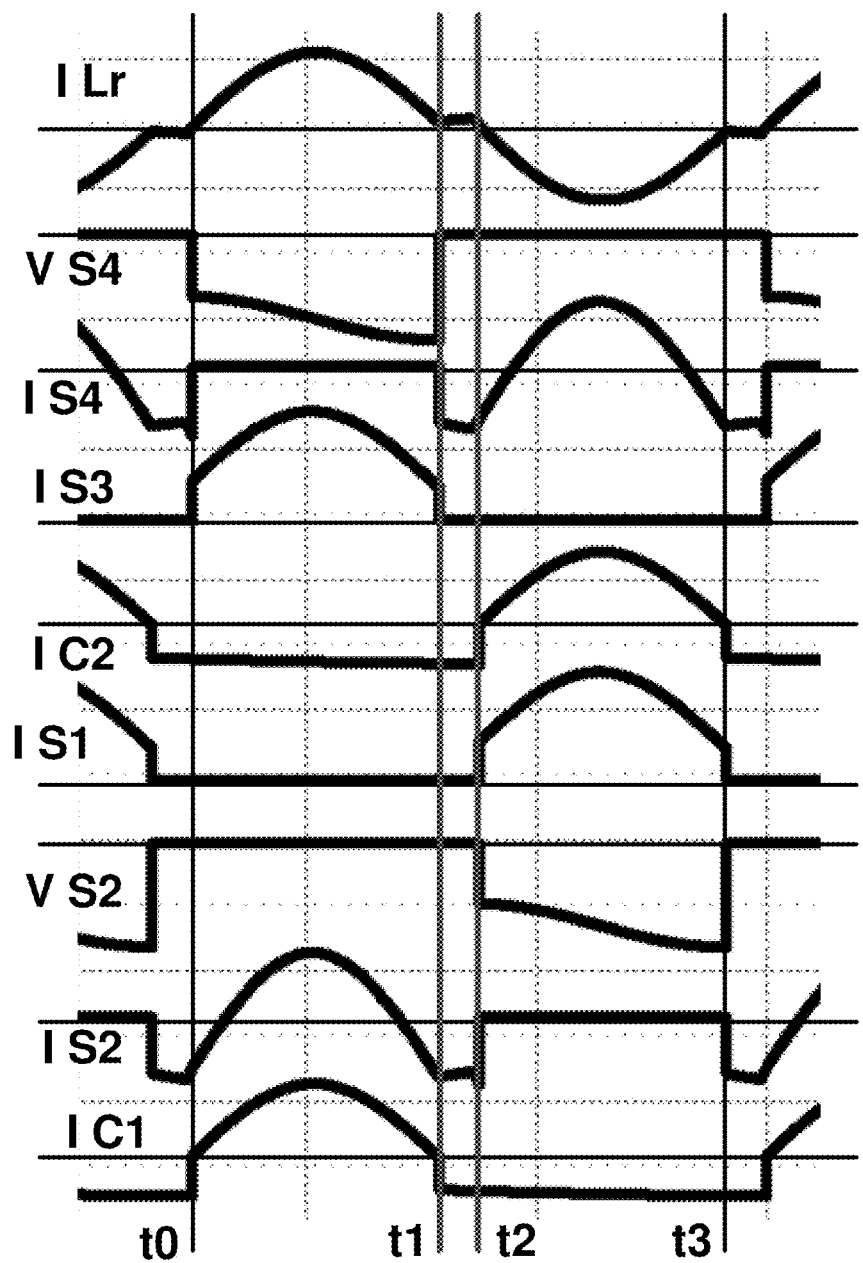
Fig. 7b time t1-t2

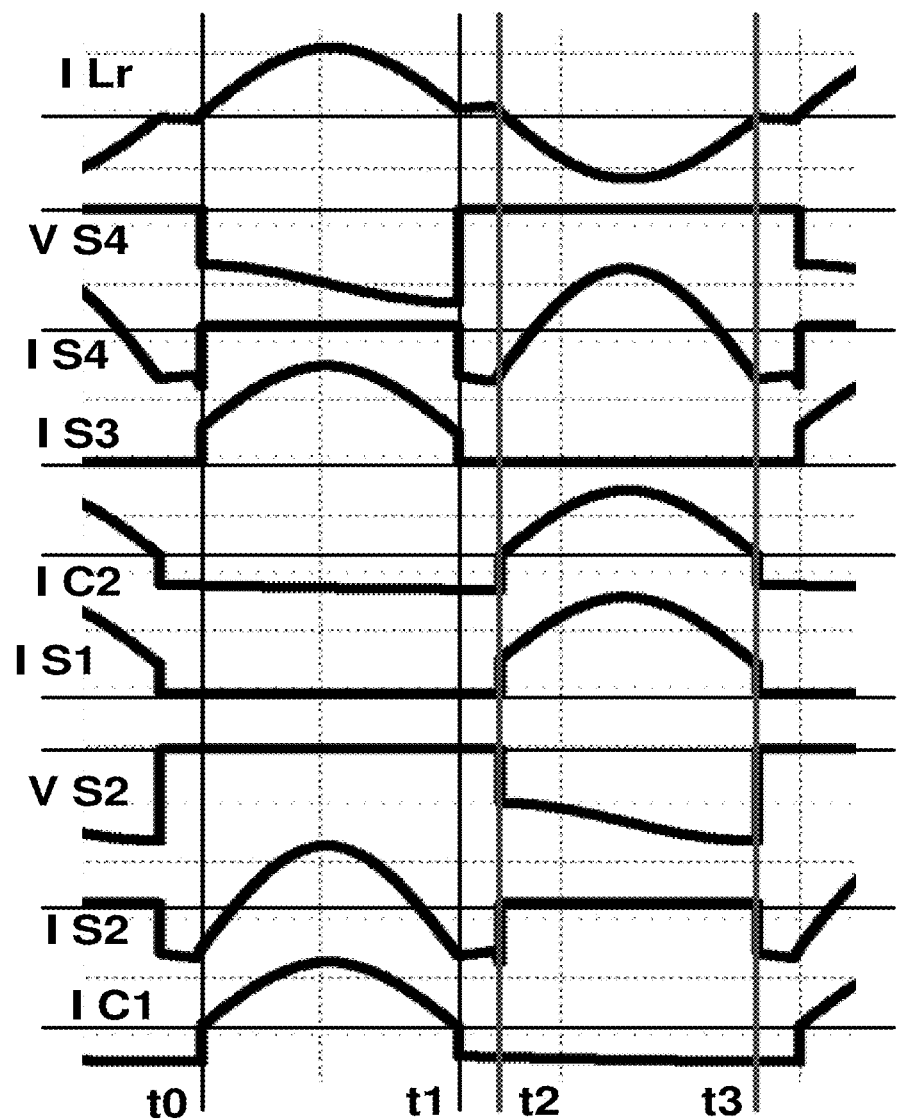
Fig. 7c time t2-t3

BI-DIRECTIONAL ISOLATED DC-DC CONVERTER FOR THE ELECTRIFICATION OF TRANSPORTATION

BACKGROUND AND SUMMARY

The subject technology relates generally to DC-DC converters and specifically to isolated, bi-directional, DC-DC converters.

The electrification of transportation is developing more and more dynamically with time. Important objects of electrification are fuel economy, increased reliability of vehicles, increased life of vehicle and equipment, and reduction in vehicle cost. Power modules for vehicle electrification generally include DC-DC converters, motor drivers, energy storage (e.g. battery) and electromagnetic machines such as alternators, generators, and motors.

FIG. 1 shows a block diagram of one aspect of the subject technology. In this configuration, the alternator can be replaced by a starter-alternator, thereby making the system more powerful, more useful, and more reliable because a 48V starter has a much higher efficiency than a 12V starter, and will be more reliable.

One purpose of the subject technology is for use in bus transportation, in start-stop mode, but there are other applications. In one aspect, there are two modes of operation. The main mode wherein energy moves from a first battery (or alternator) at a first voltage (e.g. 48V), to a second battery at a lower, second voltage (e.g. 14.5V or 12V) and also to a high voltage port/load. The latter being capable of operative connection to various components (e.g. 3 phase DC-AC motor driver).

Whereas a conventional system would ordinarily be configured such that the 48V battery and the 12V battery have their negative terminals tied to the chassis of the vehicle, the subject technology provides internal isolation between these two batteries, which reduces parasitic transient circulation currents, filter cost, and reduced EMI. An advantage is therefore realized over existing topologies which are not sufficiently cost effective.

In a second step-down mode, energy from the high voltage port flows to the low voltage ports (e.g. 48V battery and 12V battery). The first mode is primarily a step-up mode (to the motor drive) and step-down (to the twelve volt system). In the second mode, the unit provides charge to the vehicle batteries, in a step-down mode.

In one aspect, the specifications are as follows. Main Mode: Vin=42-60 VDC, Vout=13.2-15 VDC @ 300 ADC, motor drive=10 kW/13 kVA, 3 phase 208 VAC, 50-60 Hz; Second Mode: input=3 phase, 208 VAC, 50-60 Hz, output=42-56 VDC @ 120 A, and 10.5-15 VDC @ 50 ADC, the efficiency of the power unit being 93% under full load in both directions.

BRIEF DESCRIPTION OF THE DRAWINGS

FIG. 1 depicts a block diagram of one aspect of the subject technology.

FIG. 2 depicts a schematic diagram of one aspect of the subject technology.

FIG. 3A depicts a schematic diagram of one aspect of the subject technology.

FIG. 3B depicts a schematic representation of a body diode in accordance with various aspects of the subject technology.

FIG. 4A depicts a schematic diagram of one aspect of the subject technology.

FIG. 4B depicts a schematic diagram of one aspect of the subject technology.

FIG. 4C depicts a schematic diagram of one aspect of the subject technology.

FIG. 4D depicts a schematic diagram of one aspect of the subject technology.

FIG. 5A depicts a waveform diagram of one aspect of the subject technology.

FIG. 5B depicts a waveform diagram of one aspect of the subject technology.

FIG. 5C depicts a waveform diagram of one aspect of the subject technology.

FIG. 5D depicts a waveform diagram of one aspect of the subject technology.

FIG. 6A depicts a schematic diagram of one aspect of the subject technology.

FIG. 6B depicts a schematic diagram of one aspect of the subject technology.

FIG. 6C depicts a schematic diagram of one aspect of the subject technology.

FIG. 7A depicts a waveform diagram of one aspect of the subject technology.

FIG. 7B depicts a waveform diagram of one aspect of the subject technology.

FIG. 7C depicts a waveform diagram of one aspect of the subject technology.

DETAILED DESCRIPTION

FIG. 2 depicts a bi-directional, three port DC-DC converter in one aspect. In one aspect, regulation occurs before and after the isolation transformer. This configuration helps to achieve a wide range of regulation and maintain high efficiency over the full input and output voltage range and power range.

In one aspect of a step-up mode, switches S1-S4 regulate a 12 VDC output and switches S7-S8 limit the voltage to a motor drive to less than 400 VDC. In one aspect of a step-down mode, switches S7-S8 provide soft-start functionality and control the 12 VDC output, while switches S1-S4 control the 48 VDC output.

In one aspect, the subject technology includes two regulation modes. The first mode is dual current fed with switch capacitors, as described in "Step-up DC-DC converter for automotive application", A. Isurin and A. Cook, 2016, 18th European Conf. Power Electronics and Applications (EPE'16 ECCE Europe), Karlsruhe, Germany, 2016, pp. 1-9, fully incorporated by reference as if fully reproduced herein. The second mode is a resonant converter with PWM regulation as described in "A novel resonant converter topology and its application", A. Isurin and A. Cook, 2001 IEEE 32nd Annual Power Electronics Specialists Conference (PESC), Vancouver, B C, 2001, pp. 1039-1044 vol. 2; and "9 kW Isolated DC-DC Converter for Hybrid Bus", A. Isurin and A. Cook, Proc. Int. Exhibition & Conf. Power Electronics, Intelligent Motion and Power Quality 2012 (PCIM Europe 20152), Nuremberg, Germany, 2012, both of which are fully incorporated by reference as if fully reproduced herein.

FIG. 3A depicts one aspect of the subject technology showing a two port DC-DC bi-directional converter capable of operating in step-up or step-down mode. With reference, for example, to FIGS. 2 & 3A, it is to be understood that the terminals of a given component are labelled as follows: for vertical orientation in the figure, the upper terminal is the first terminal and the lower terminal is the second terminal. For horizontal orientation, the left terminal is the first terminal and the right terminal is the second terminal. Reference characters as indicated in FIGS. 2 & 3A are intended to apply to components in both said figures even though only recited in one or the other of said figures.

In one aspect, a bi-directional DC-DC converter 20 comprises a first stage 30 comprising a first switch S1 having first and second terminals, the first switch having a body diode, an anode of the body diode of the first switch being connected to the second terminal of the first switch, a cathode of the body diode of the first switch being connected to the first terminal of the first switch; a second switch S2 having first and second terminals the second switch having a body diode, an anode of the body diode of the second switch being connected to the first terminal of the second switch, a cathode of the body diode of the second switch being connected to the second terminal of the second switch; a third switch S3 having first and second terminals the third switch having a body diode, an anode of the body diode of the third switch being connected to the first terminal of the third switch, a cathode of the body diode of the third switch being connected to the second terminal of the third switch; a fourth switch S4 having first and second terminals the fourth switch having a body diode, an anode of the body diode of the fourth switch being connected to the second terminal of the fourth switch, a cathode of the body diode of the fourth switch being connected to the first terminal of the fourth switch; a first inductor L1 having first and second terminals; a second inductor L2 having first and second terminals; a first capacitor C1 having first and second terminals; a second capacitor C2 having first and second terminals; a primary winding 80 of a first transformer Tr1, the primary winding of the first transformer having first and second terminals; the first terminal of the first inductor L1 being connected to a first node N1; the second terminal of the first inductor L1 being connected to a second node N2; the first terminal of the third switch S3 being connected to ground; the second terminal of the third switch S3 being connected to the second node N2; the first terminal of the first capacitor C1 being connected to the second node N2; the second terminal of the first capacitor C1 being connected to a third node N3; the first terminal of the fourth switch S4 being connected to ground; the second terminal of the fourth switch S4 being connected to the third node N3; the first terminal of the primary winding 80 of the first transformer Tr1 being connected to the third node N3; the second terminal of the primary winding 80 of the first transformer Tr1 being connected to a fourth node N4; the first terminal of the second switch S2 being connected to the fourth node N4; the second terminal of the second switch S2 being connected to ground; the first terminal of the second capacitor C2 being connected to a fifth node N5; the second terminal of the second capacitor C2 being connected to the fourth node N4; the first terminal of the second inductor L2 being connected to the first node N1; the second terminal of the second inductor L2 being connected to the fifth node N5; and a first port 22 between the first node N1 and ground;

a second stage 40 comprising a fifth switch S5 having first and second terminals the fifth switch having a body diode, an anode of the body diode of the fifth switch being connected to the second terminal of the fifth switch, a cathode of the body diode of the fifth switch being connected to the first terminal of the fifth switch; a sixth switch S6 having first and second terminals the sixth switch having a body diode, an anode of the body diode of the sixth switch being connected to the second terminal of the sixth switch, a cathode of the body diode of the sixth switch being connected to the first terminal of the sixth switch; a seventh switch S7 having first and second terminals the seventh switch having a body diode, an anode of the body diode of the seventh switch being connected to the second terminal of the seventh switch, a cathode of the body diode of the seventh switch being connected to the first terminal of the seventh switch; an eighth switch S8 having first and second terminals the eighth switch having a body diode, an anode of the body diode of the eighth switch being connected to the first terminal of the eighth switch, a cathode of the body diode of the eighth switch being connected to the second terminal of the eighth switch; a secondary winding 82 of the first transformer Tr1, the secondary winding of the first transformer having first and second terminals; a first resonant inductor Lr1 having first and second terminals; a first resonant capacitor Cr1 having first and second terminals; a second resonant capacitor Cr2 having first and second terminals; a third resonant capacitor Cr3 having first and second terminals; a fourth resonant capacitor Cr4 having first and second terminals; a first diode D1 having first and second terminals; a second diode D2 having first and second terminals; the first terminal of the fifth switch S5 being connected to a seventh node N7; the second terminal of the fifth switch S5 being connected to a sixth node N6; the first terminal of the sixth switch S6 being connected to the sixth node N6; the second terminal of the sixth switch S6 being connected to an eighth node; the first terminal of the seventh switch S7 being connected to a tenth node N10; the second terminal of the seventh switch S7 being connected to an eleventh node N11; the first terminal of the eighth switch S8 being connected to the eleventh node N11; the second terminal of the eighth switch S8 being connected to a twelfth node; the first terminal of the secondary winding 82 of the first transformer Tr1 being connected to the sixth node N6; the second terminal of the secondary winding 82 of the first transformer Tr1 being connected to a ninth node; the first terminal of the first resonant inductor Lr1 being connected to the ninth node N9; the second terminal of the first resonant inductor Lr1 being connected to the tenth node N10; the first terminal of the first resonant capacitor Cr1 being connected to the seventh node N7; the second terminal of the first resonant capacitor Cr1 being connected to the twelfth node N12; the first terminal of the second resonant capacitor Cr2 being connected to the twelfth node N12; the second terminal of the second resonant capacitor Cr2 being connected to the eighth node N8; the first terminal of the third resonant capacitor Cr3 being connected to the seventh node N7; the second terminal of the third resonant capacitor Cr3 being connected to the tenth node N10; the first terminal of the fourth resonant capacitor Cr4 being connected to the tenth node N10; the second terminal of the fourth resonant capacitor Cr4 being connected to the eighth node N8; the first terminal of the first diode D1 being connected to the seventh node N7; the second terminal of the first diode D1 being connected to the tenth node N10; the first terminal of the second diode D2 being connected to the tenth node N10; the second terminal of the second diode D2 being connected to the eighth node N8; and a second port 24 connected between the seventh and eighth nodes N7, N8.

In one aspect, first voltage source V1 is connected between the first node N1 and ground. In another aspect, a second voltage source V2 is connected between the seventh and eighth nodes N7, N8. In another aspect, a first load RL1 is connected between the seventh and eighth nodes N7, N8. In another aspect, a second load RL2 is connected between the first node N1 and ground. In one aspect, the switch S2 is bi-directional. In another aspect, the switches S2 and S4 are bi-directional.

In one aspect, a bi-directional DC-DC converter 20 comprises a first stage 30 comprising: a first port 22 connected between a first node N1 and ground; the first port 22 being bi-directionally operable as an output or an input; the first port 22 being operatively connected to a primary winding 80 of a first transformer Tr1; a second stage 40 comprising: a second port 24 connected between seventh and eighth nodes N7, N8; the second port 24 being bi-directionally operable as an output or an input; the second port 24 being operatively connected to a secondary winding 82 of the first transformer Tr1; the secondary winding of the first transformer having first and second terminals.

It should be understood that functionality of a "switch" as used herein, can be realized in various ways as will be appreciated by those of skill in the art, including using MOSFETs, and power MOSFETs. It should be understood that a winding of a transformer in accordance with the subject technology is characterized as primary or secondary depending on the mode of operation. For example, first transformer Tr1 (FIG. 2) is a primary winding 80 when operated in step-up mode; whereas such winding is understood to be a secondary winding in step-down mode.

FIG. 2 depicts one aspect wherein, a bi-directional DC-DC converter 50 comprises a second resonant inductor Lr2 having first and second terminals; a fifth resonant capacitor Cr5 having first and second terminals; a primary winding 90 of a second transformer Tr2, the primary winding of the second transformer having first and second terminals; a secondary winding 92 of the second transformer Tr2, the secondary winding of the second transformer having first and second terminals; a rectifier 70 having an input comprising first and second terminals; the rectifier 70 having an output comprising first and second terminals; the first terminal of the second resonant inductor Lr2 being connected to the third node N3, the second terminal of the second resonant inductor Lr2 being connected to a thirteenth node N13; the first terminal of the fifth resonant capacitor Cr5 being connected to the fourth node N4, the second terminal of the fifth resonant capacitor Cr5 being connected to an eighteenth node N18; the first terminal of the input of the rectifier 70 being connected to a fourteenth node N14, the second terminal of the input of the rectifier 70 being connected to a seventeenth node N17; and the first terminal of the output of the rectifier 70 being connected to a sixteenth node N16, the second terminal of the output of the rectifier 70 being connected to a fifthteenth node N15. As shown in FIG. 2, the primary winding 90 of the second transformer Tr2 is connected between the second resonant inductor Lr2 and the fifth resonant capacitor Cr5. The skilled person, after having studied FIG. 2, would understand that the fourth and thirteenth nodes would not always be at the same electrical potential.

In one aspect, a third voltage source V3 is connected between the fifthteenth and sixteenth nodes 15, 16. In one aspect, a third load RL3 is connected between the fifthteenth and sixteenth nodes 15, 16.

In one aspect of a step-up mode, the main regulation is done by PWM functionality controlled by S1-S4 and S7-S8. It is also possible to regulate using variable frequency with PWM or variable frequency with fixed timing for S1 and S3. It should be noted that, in step-up mode, the "primary winding" comprises the leg of transformer Tr1 that is between nodes N3 and N4, whereas in step-down mode the "primary winding" comprises the leg of transformer Tr1 that is between nodes N6 and N9.

In this mode, switches S5 and S6 operate as a simple rectifier. Optimal conditions are chosen for switches S1-S4, and switches S7-S8 provide regulation. For operation with a 50% duty cycle of S1 and S3, switches S2 and S4 are complementary to S1 and S3 (i.e. S2 is off when S1 is on, and vice versa; S4 is off when S3 is on, and vice versa).

In one aspect, component values and timing are chosen such that, at a time t0 (FIG. 4A), capacitors C1 and C2 are charged with a polarity as shown in FIG. 4A, S3 is turned-on, S4 is turned off, and current from source V1 (aka first voltage source V1) flows via inductor L1 and switch S3, S1 is turned off and S2 is turned on completing a circuit to discharge C1 via the primary winding 80 of first transformer Tr1; on the secondary side of the first transformer Tr1 (winding 82), current flows via the body diode of switch S6, the resonant inductor Lr1, resonant capacitors Cr1-Cr4, switch S7, body diode of switch S8, and the first load RL1, the current flowing via the first resonant inductor Lr1 starting from zero and being approximately sinusoidal in waveform as shown in FIGS. 5A-D, S2 completes a circuit to charge C2 through inductor L2, since S1 is turned off this time; the current via S2 starts equal to the current in inductor L2 and decays because the current from C1 is in the opposite direction, and when the current in C1 reaches a maximum the current via S2 will have reversed direction. In this aspect, switch S2 is bi-directional to allow current to flow through it in both directions during a first half-cycle (S4 is bi-directional for analogous operation in a second half cycle).

At time t1, switch S7 is turned off and interrupts the current flowing to capacitors Cr1 and Cr2, and switch S8 is turned on in preparation for the next half cycle of power conversion; this interruption happens under zero voltage conditions because switch S7 is between two capacitors, Cr1 and Cr2 on one side, and Cr3 and Cr4 on the other side (in this aspect, the values of Cr3 and Cr4 are much smaller than Cr1 and Cr2). The main purpose of Cr3 and Cr4 in one aspect is to provide soft switching for switches S7 and S8.

During the interval t1-t2, on the primary side of the transformer (winding 80), current flows as shown in FIG. 4B; on the secondary side (winding 82), the current flows directly to the load, and will decay linearly, reaching zero at time t2, while only magnetizing current flows on the primary side of the transformer; during the interval t2-t3, only magnetizing current flows on the primary side of the transformer, and the process of power conversion is interrupted on the secondary side as depicted in FIG. 4C; at time t3, S2 and S3 are turned-off, S1 and S4 are turned-on, and a new half cycle starts, similar to interval t0-t1, but the current flowing via primary winding will be in the opposite direction.

In one aspect, FIGS. 4A-4D & 5A-5D depict a method for DC-DC voltage conversion wherein a first load RL1 is connected between the seventh and eighth nodes N7, N8, a first voltage source V1 is connected between the first node N1 and ground, wherein the capacitances of the third and fourth resonant capacitors are relatively less than the capacitances of the first and second resonant capacitors; switches S1 and S3 are switched in an alternating manner according to a pre-determined duty cycle (in one aspect, the pre-determined duty cycle is 50%) and frequency, wherein switch S2 is switched complementary to switch S1, and switch S4 is switched complementary to switch S3; maintaining switches S5 and S6 in a non-conducting state; at a time t0, (FIG. 4A) switches S2 and S3 are turned on, switches S1 and S4 are turned off, switch S7 is turned on, and switch S8 is turned off; then at a time t1, (FIG. 4B) switch S7 is turned off, and switch S8 is turned on; then at a time t3, (FIG. 4D) switches S2 and S3 are turned off, and switches S1 and S4 are turned on; then at a time t4, switch S7 is turned on, and switch S8 is turned off.

It should be understood that "complementary" as used herein means that switches (e.g. transistors) are turned off/on such that when one switch is on, a complementary switch is off; it should moreover be understood that such on/off switching is not necessarily instantaneous. It should be understood that, when a switch is maintained in a non-conducting state, the transistor (or switch) is not conducting but a body diode is still capable of conducting. Thus, in this respect, the switch is operating as a simple rectifier. Those of skill in the art will appreciate that "switched", or "turned on" as used in a switching context, is analogous to a switch being closed, and/or a switch or a transistor being in a state of conducting current.

In one aspect, component values, timing, and duty cycle are selected such that during first and second half-cycles, the second half cycle being substantially identical to the first half-cycle but 180 degrees out of phase thereto, during the first half-cycle occurring between the time t0 and the time t3, a current flowing through the first resonant inductor Lr1 from approximately zero, in an approximately semi-sinusoidal waveform between the time t0 and a time t2, and being approximately zero between the time t2 and the time t3; during the first half-cycle, when the current in the first capacitor C1 reaches a maximum, the current via switch S2 will have reversed direction; between the time t1 and the time t2, the current flowing through the first load RL1 decays linearly, and reaches zero at the time t2, between the time t2 and the time t3, only magnetizing current flows through the first transformer Tr1.

The foregoing processes are repeated in the second half cycle in reverse direction, beginning at time t3. As shown in FIGS. 4D & 5D, switch S4 assumes the bi-directional role, as the first capacitor C1 is charged via the first inductor L1 and switch S4, while the second capacitor is discharged via switch S1, the primary winding of the transformer Tr1, and switch S4; when the current in the second capacitor C2 reaches a maximum, the current via switch S4 will have reversed direction.

In one aspect of a step-down mode, the regulation is done by PWM of switches S1-S4 and S7-S8. Variable frequency may also be used in conjunction with PWM. The switches S7-S8 provide soft start functionality, and limit the maximum output voltage.

In one aspect (e.g. FIGS. 6A-6C), switches S7-S8 are considered as permanently on, considering that the input voltage is minimum and output voltage is maximum, at moderate and maximum load current. In other words, the post-transformer switches, S1-S4, operate as a boost circuit. In one aspect, switches S5-S6 work with a duty cycle of 50% and the commutation frequency is 20% below the tank resonant frequency.

The resonance frequency of the tank is determined by:

$$f_r = \frac{1}{2\pi\sqrt{L_r \cdot C_r}}, \text{ where } C_r = \frac{(C_{R1} + C_{R2}) \cdot C_1}{n^2(C_{R1} + C_{R2}) + C_1}$$

In one aspect, component values and timing are chosen such that, at a time t0, capacitors C1 and C2 are charged with a polarity as shown in FIG. 6A; switch S6 is turned on, switch S5 is turned off, and current from source V2 (aka second voltage source V2) flows via the resonant capacitors Cr1 & Cr2, first resonant inductor Lr1, and primary winding 82 of the first transformer Tr1, the current flowing via the first resonant inductor Lr1 starting from zero, and being approximately sinusoidal in waveform, and reaching zero at time t1; on the secondary side of the first transformer Tr1 (winding 80), switch S3 is turned on, and switch S4 is turned off, this commutation charges capacitor C1 by current flowing in the secondary winding 80, the current flowing via switches S2 and S3; between times t0 & t1, the capacitor C2 continues to discharge to second load RL2 via inductor L2 and switch S2, in this aspect, switch S2 is bi-directional to allow current to flow through it in both directions during a first half-cycle (S4 is bi-directional for analogous operation in a second half cycle);

at time t1: current flow in capacitor C1 reaches zero, in other words, the process of charging capacitor C1 is finished; switch S3 is turned off, and switch S4 is turned on, this commutation provides that capacitor C1 starts to discharge to load via inductor L1 and switch S4; between times t1 & t2, both capacitors C1 and C2 are discharged to second load RL2 (FIG. 6B); during this time, the current flow on the primary side (winding 82) of the first transformer Tr1, is magnetizing current only; at time t2, switch S5 is turned on and switch S6 is turned off, switch S1 is turned on and switch S2 is turned off, and a new half cycle starts, similar to period t0-t2, but the current flowing via primary winding will be in the opposite direction (FIG. 6C); at a time t3, switch S1 is turned off, switch S2 is turned on; at a time t4, switch S5 is turned off, switch S6 is turned on, switch S3 is turned on, and switch S4 is turned off.

In one aspect, FIGS. 6A-6C & 7A-7C depict a method for DC-DC voltage conversion wherein a second load RL2 is connected between the first node N1 and ground, a second voltage source V2 is connected between the seventh and eighth nodes N7 & N8; maintaining switches S7 and S8 in a conducting state; switching switches S5 and S6 in an alternating manner according to a pre-determined duty cycle and frequency; at a time t0 (FIG. 6A), switch S1 is off, switch S2 is on, switch S5 is turned off, switch S6 is turned on, switch S3 is turned on, switch S4 is turned off, at a time t1 (FIG. 6B), switch S3 is turned off, and switch S4 is turned on; at a time t2 (start of a new half-cycle), switch S5 is turned on, switch S6 is turned off, switch S1 is turned on, and switch S2 is turned off; at a time t3, switch S1 is turned off, switch S2 is turned on, a new half-cycle begins at a time t4. It should be understood that, when a switch is maintained in a conducting state, the transistor (or switch) is conducting, or "on".

In one aspect, the pre-determined duty cycle is 50%, and the commutation frequency is 20% below the tank resonant frequency. In one aspect, component values, timing, and duty cycle are selected such that: at the time t0, a current flowing through the first resonant inductor Lr1 starts from zero and flows in a positive direction in a semi-sinusoidal waveform and reaches zero at the time t1, the first capacitor C1 charges via switch S3, the secondary of the first transformer Tr1, and the switch S2, the second capacitor C2 discharges to the second load RL2 via the second inductor L2 and the switch S2; at the time t1, the first capacitor C1 is substantially charged; the first and second capacitors C1 and C2 discharge to the second load RL2 during at least a portion of the interval between the times t0 and t1; at the time t2, a current flowing through the first resonant inductor Lr1 starts from zero and flows in a negative direction in a semi-sinusoidal waveform and reaches zero at the time t3, the second capacitor C2 begins to charge; at the time t3, the second capacitor C2 is substantially charged.

For a three port bidirectional isolated DC-DC converter (or two-port as described in "Accurate Power Loss Model Derivation of a High-Current Dual Active Bridge Converter for an Automotive Application", Florian Krismer, Johann W. Kolar, IEEE Trans. on Ind. Electron., Vol. 57, no. 3, pp. 881-891, 2010; and "An Isolated Three-Port Bidirectional DC-DC Converter With Decoupled Power Flow Management", Chuanhong Zhao, Simon D. Round, Johann W. Kolar, IEEE Trans. on Power Electron., vol. 23, no. 5, pp. 2443-2453, September 2008, both of which are fully incorporated by reference as if fully reproduced herein), the DAB (dual active bridge) topology is very applicable, and is thus compared to the subject technology (two-port variant) with a two-port DAB. Tables 1 & 2 show the general advantages and disadvantages of these topologies. Table 3 shows comparisons of critical electrical parameters for the topologies for a specific application as described above. The comparison of cost was made keeping the following norms constant: $V_{in}$, $V_{out}$, $P_{out}$ and efficiency. This comparison does not include labor costs, heat sinks and enclosures. The main disadvantage of DAB topology is a high level of re-circulating current. This problem leads to a reduced time of actual energy transfer compared with the conduction cycle. Therefore, to obtain acceptable efficiency and low level of EMI, commutation frequency must be reduced, leading to increased cost of the converter using a DAB topology compared with the new topology. In the case described, the efficiency is important because a battery is used as the source of energy.

TABLE 1

Advantages and Disadvantages of DAB

| Advantages | Disadvantages |
|---|---|
| Simple control | Very difficult to provide ZVS across full power range, from idle to full power |
| Constant frequency | High ripple current in $C_{IN}$ & $C_{OUT}$ |
| | Relatively large transformer |
| | High current during switching |

TABLE 2

Advantages and Disadvantages of NEW topology

| Advantages | Disadvantages |
|---|---|
| The current via winding is sinusoidal | Relatively complicated control Depending on mode |
| Around twice reduction turn ratio of transformer | Commutation frequency limited by capacitors C1-C2. |
| Relatively small input ripples current. | High current stress in capacitors C1-C2. |

TABLE 3

Comparisons main critical electrical parameters for both topologies

Vin-42/62 VDC Vout-400 VDC Iout-25 A

| Topology | fcom | Low voltage side | | | | COST |
|---|---|---|---|---|---|---|
| | | Irms-Tx | Ipeak-Tx | Icomm Sem | Vcomm | |
| DAB | 50 kHz | 343/249 A | 417/398 A | 370/396 A | 42/62 V | 1.41 |
| NEW | 100 kHz | 113/112 A | 160/189 A | 74/145 A | 52/45 V | 1.0 |

$I_{rms-Tx}$: RMS Current in the transformer
$I_{comm-sem}$: Current at Commutation
$V_{comm}$: Voltage at Commutation
$I_{peak-Tx}$: Peak Current in the transformer The subject technology is advantageous over the DAB topology, having better results as far as cost and application area, but it is limited by capacitors C1 and C2 (FIG. 2). In other words, more attention should be paid to the selection of these parts.

Those of skill in the art will appreciate that components are sometimes referred to herein without the designation of the type of component. For example, switch S1 is sometimes referred to as S1 without the designation of "switch", or capacitor C1 may be referred to as C1.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:
1. A bi-directional DC-DC converter (50) comprising:
a first stage (30) comprising:
a first port (22) connected between a first node (N1) and ground;
the first port (22) being bi-directionally operable as an output or an input;
the first port (22) being operatively connected to a primary winding (80) of a first transformer (Tr1);
a second stage (40) comprising:
a second port (24) connected between seventh and eighth nodes (N7, N8);
the second port (24) being bi-directionally operable as an output or an input;
the second port (24) being operatively connected to a secondary winding (82) of the first transformer (Tr1);
the secondary winding of the first transformer having first and second terminals;
a third stage (60) comprising:
a second resonant inductor (Lr2) having first and second terminals,
a fifth resonant capacitor (Cr5) having first and second terminals;
a primary winding (90) of a second transformer (Tr2), the primary winding of the second transformer having first and second terminals;
a secondary winding (92) of the second transformer (Tr2),
the secondary winding of the second transformer having first and second terminals;
a rectifier (70) having an input comprising first and second terminals;
the rectifier (70) having an output comprising first and second terminals;
the first terminal of the second resonant inductor (Lr2) being connected to a third node (N3);

the second terminal of the second resonant inductor (Lr2) being connected to a thirteenth node (N13);

the first terminal of the fifth resonant capacitor (Cr5) being connected to a fourth node (N4);

the second terminal of the fifth resonant capacitor (Cr5) being connected to an eighteenth node (N18);

the first terminal of the input of the rectifier (70) being connected to a fourteenth node (N14);

the second terminal of the input of the rectifier (70) being connected to a seventeenth node (N17);

the first terminal of the output of the rectifier (70) being connected to a sixteenth node (N16);

the second terminal of the output of the rectifier (70) being connected to a fifteenth node (N15);

the primary winding (90) of the second transformer (Tr2) being connected between the second resonant inductor (Lr2) and the fifth resonant capacitor (Cr5);

the fourth and thirteenth nodes not always being at the same electrical potential.

2. A bi-directional DC-DC converter (50) comprising:

a first stage (30) comprising:
  a first port (22) connected between a first node (N1) and ground;
  the first port (22) being bi-directionally operable as an output or an input;
  the first port (22) being operatively connected to a primary winding (80) of a first transformer (Tr1);

a second stage (40) comprising:
  a second port (24) connected between seventh and eighth nodes (N7, N8);
  the second port (24) being bi-directionally operable as an output or an input;
  the second port (24) being operatively connected to a secondary winding (82) of the first transformer (Tr1);
  the secondary winding of the first transformer having first and second terminals;

a third stage (60) comprising:
  a second resonant inductor (Lr2) having first and second terminals,
  a fifth resonant capacitor (Cr5) having first and second terminals;
  a primary winding (90) of a second transformer (Tr2), the primary winding of the second transformer having first and second terminals;
  a secondary winding (92) of the second transformer (Tr2),
  the secondary winding of the second transformer having first and second terminals;
  a rectifier (70) having an input comprising first and second terminals;
  the rectifier (70) having an output comprising first and second terminals;
  the first terminal of the second resonant inductor (Lr2) being connected to a third node (N3);
  the second terminal of the second resonant inductor (Lr2) being connected to a thirteenth node (N13);
  the first terminal of the fifth resonant capacitor (Cr5) being connected to a fourth node (N4);
  the second terminal of the fifth resonant capacitor (Cr5) being connected to an eighteenth node (N18);
  the first terminal of the primary winding (90) of the second transformer (Tr2) being connected to the thirteenth node (N13);
  the second terminal of the primary winding (90) of the second transformer (Tr2) being connected to the eighteenth node (N18);
  the first terminal of the secondary winding (92) of the second transformer (Tr2) being connected to a fourteenth node (N14);
  the second terminal of the secondary winding (92) of the second transformer (Tr2) being connected to a seventeenth node (N17);
  the first terminal of the input of the rectifier (70) being connected to the fourteenth node (N14);
  the second terminal of the input of the rectifier (70) being connected to the seventeenth node (N17);
  the first terminal of the output of the rectifier (70) being connected to a sixteenth node (N16);
  the second terminal of the output of the rectifier (70) being connected to a fifteenth node (N15).

3. The bi-directional DC-DC converter (50) of claim 2 further comprising a third voltage source (V3) being connected between the fifteenth and sixteenth nodes (N15, N16).

4. The bi-directional DC-DC converter (50) of claim 2 further comprising a third load (RL3) being connected between the fifteenth and sixteenth nodes (N15, N16).

* * * * *